Patented Mar. 7, 1933

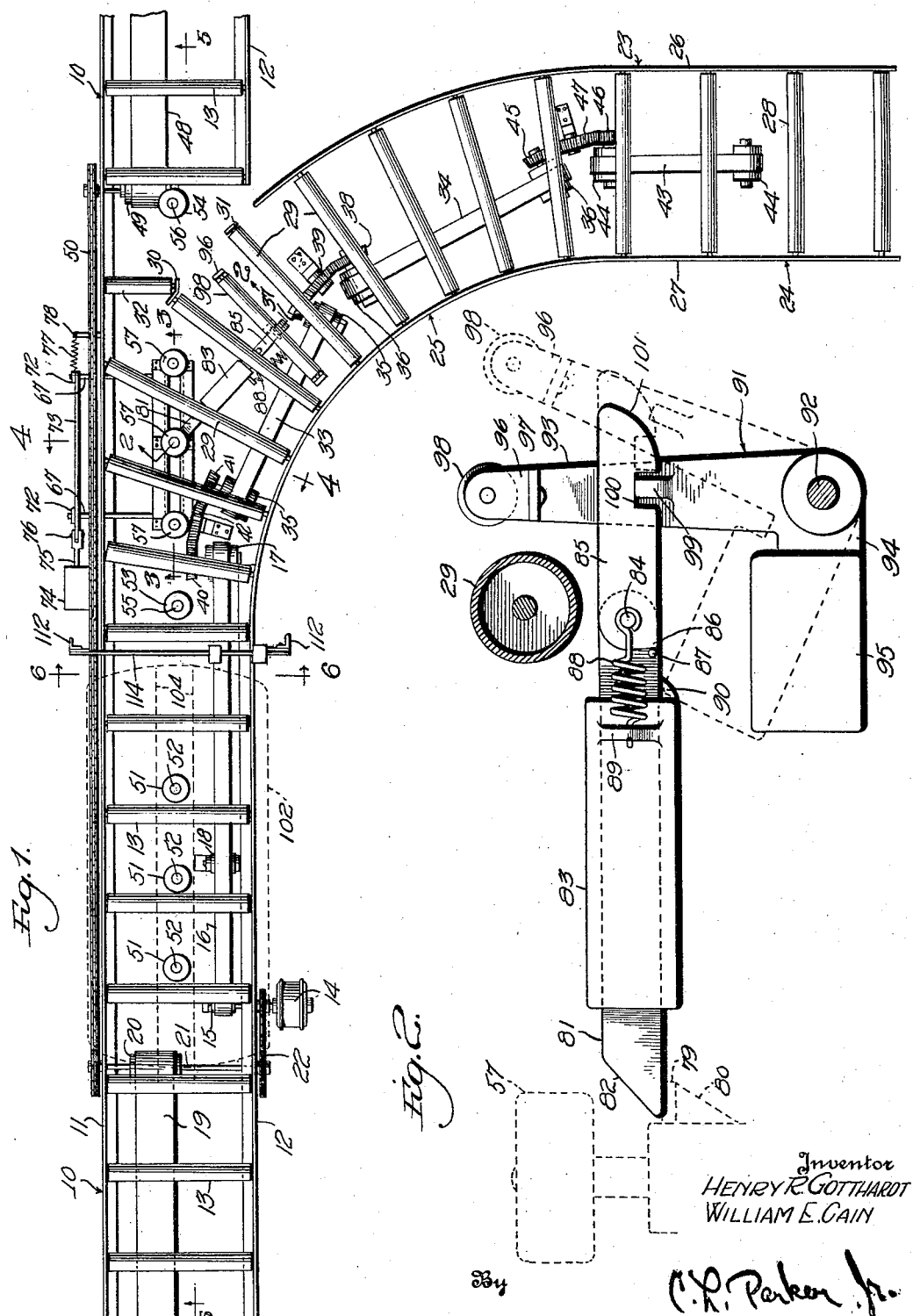

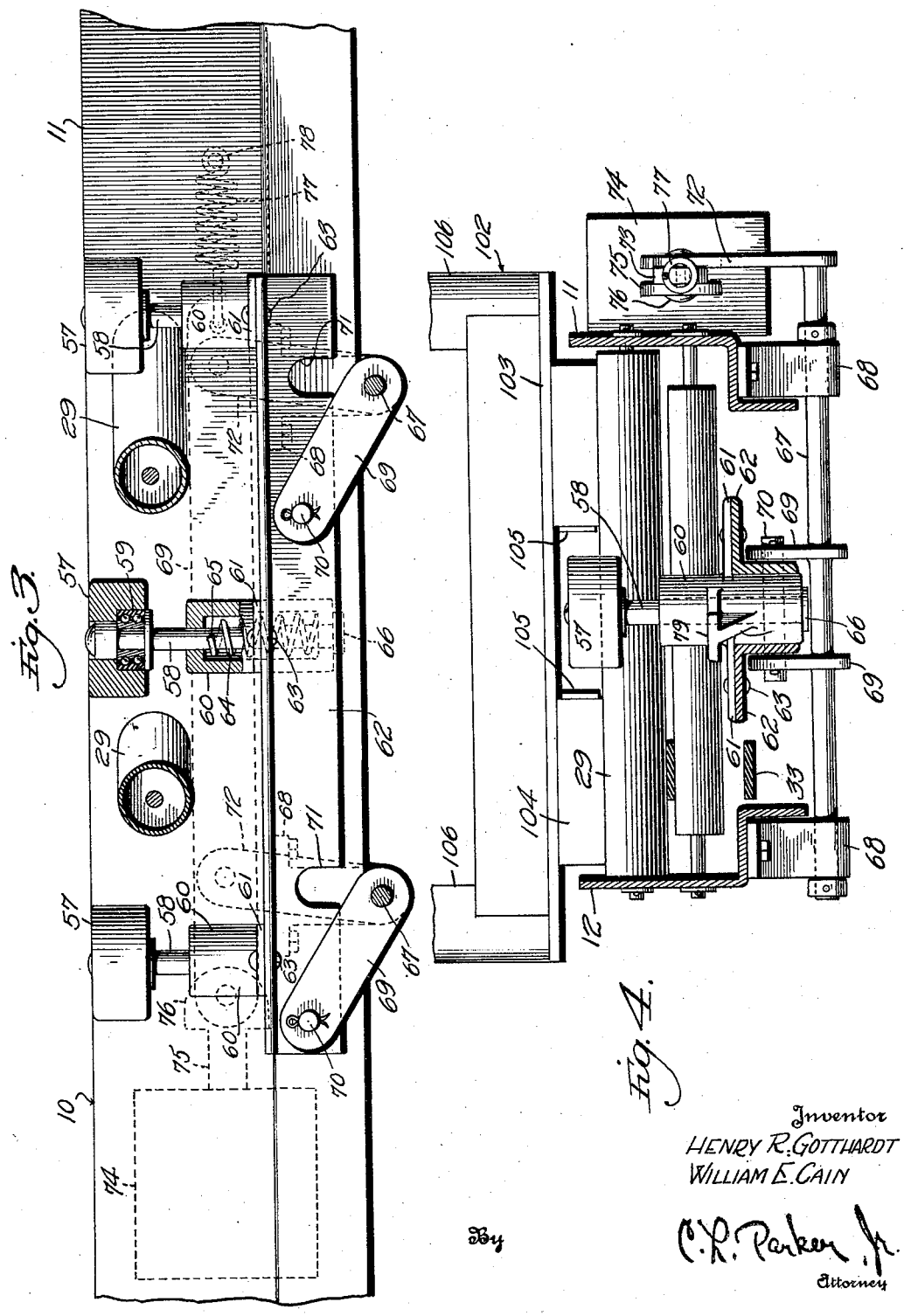

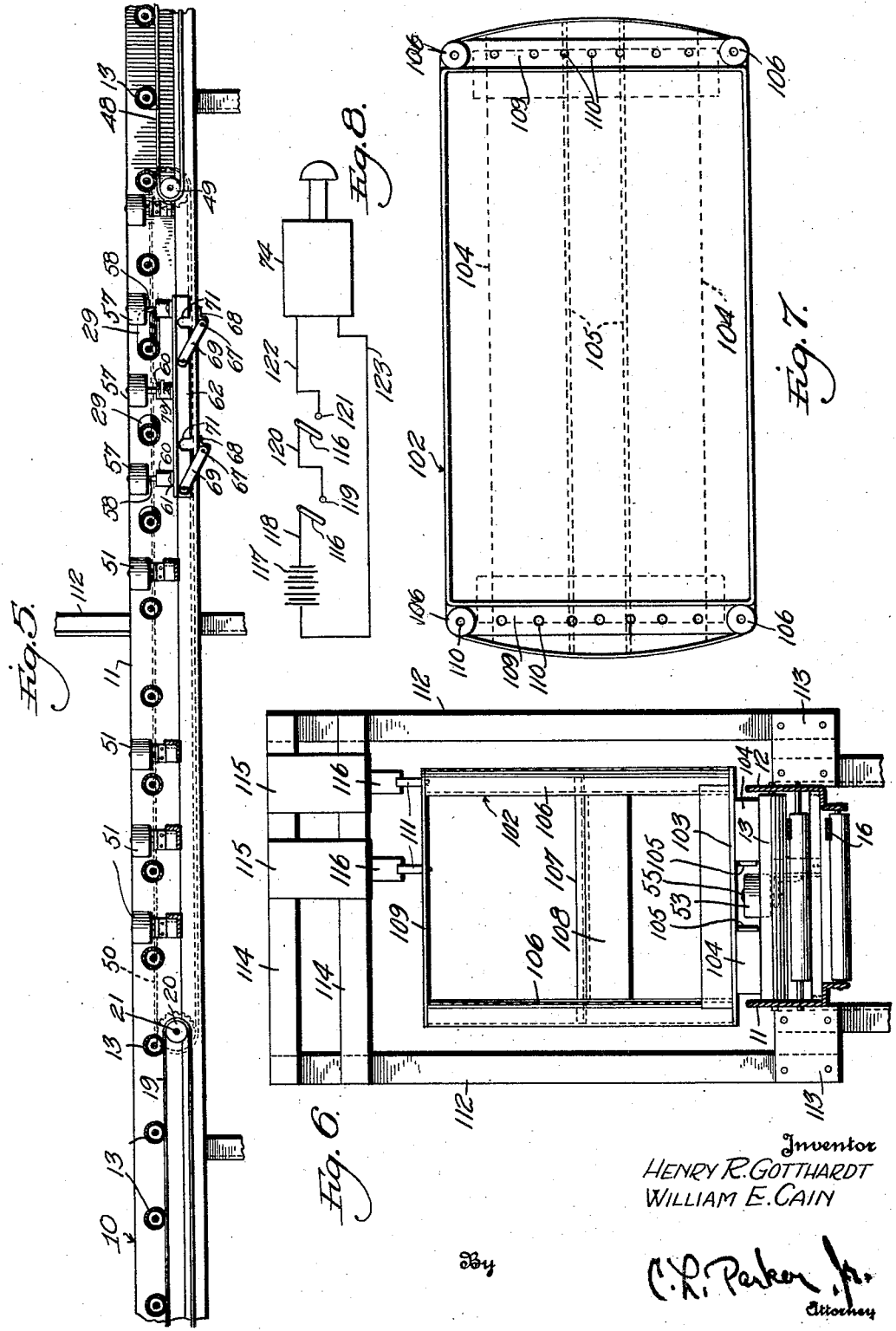

1,900,602

UNITED STATES PATENT OFFICE

HENRY R. GOTTHARDT, OF LOUISVILLE, KENTUCKY, AND WILLIAM E. CAIN, OF JEFFERSONVILLE, INDIANA, ASSIGNORS TO LOGAN CO., INC., OF LOUISVILLE, KENTUCKY, A CORPORATION OF KENTUCKY

SWITCHING CONVEYER

Application filed May 21, 1931. Serial No. 539,082.

This invention relates to switching conveyers, and more particularly to a conveying system adapted for automatic operation for switching articles from main to branch conveyers.

An important object of the invention is to provide a conveying system having a main conveyer and a plurality of branch conveyers associated therewith, and to provide means operative for switching an article, package or carrier from the main conveyer to either of its branches.

A further object is to provide an apparatus of the above mentioned character which is adapted for completely automatic operation whereby a carrier or the like leaving the loading point of the main conveyer may be keyed for discharge to either of a plurality of branch conveyers.

A further object is to provide a conveying system of the character referred to wherein each branch conveyer forms a continuation of the adjacent portion of the main conveyer whereby carriers and the like on the main conveyer tend to move off to each branch conveyer, and to provide means associated with each switching point normally operative to prevent the switching of the carriers whereby they are caused to move continuously along the main conveyer, control devices being operable by the carriers for rendering either of said means inoperative to determine the branch conveyer to which the carrier is to be discharged.

A further object is to provide a switching conveyer system having normally operative means at each switching point engageable with a carrier on the conveyer to guide it for movement along the main conveyer, and to provide means operative by the carrier for rendering said last named means inoperative whereby the carrier may be discharged to either of the conveyer branches.

A further object is to provide means operative by an article as it moves to a branch conveyer for restoring the normal condition of the means which normally operates to cause the articles to travel along the main conveyer whereby following articles are enabled to travel to their proper destinations.

A further object is to provide a novel article carrier adapted for use with the conveyer whereby articles in the carrier may be conveyed to any desired destination.

A further object is to provide a novel form of carrier which is keyed in accordance with the desired destination of the carrier whereby the latter may be discharged to either of the branch conveyers.

Other objects and advantages of the invention will become apparent during the course of the following description.

In the drawings we have shown one embodiment of the invention. In this showing,

Figure 1 is a plan view,

Figure 2 is an enlarged detail sectional view taken substantially on line 2—2 of Figure 1, showing the latch device, Figure 3 is an enlarged vertical sectional view taken substantially on line 3—3 of Figure 1, Figure 4 is a transverse section taken substantially on line 4—4 of Figure 1, Figure 5 is a longitudinal sectional view on line 5—5 of Figure 1, Figure 6 is a transverse vertical section on line 6—6 of Figure 1, Figure 7 is a plan view of the carrier, and, Figure 8 is a wiring diagram.

Referring to Figure 1, the numeral 10 designates a main conveyer including an outer side rail 11 and inner side rail sections 12 between which are journalled conveyer rollers 13. The invention is operative in connection with a gravity conveyer, but has been illustrated in the drawings in conjunction with a live roller conveyer.

As shown in Figure 1 a source of power for driving the rollers has been illustrated in the form of a motor 14 driving a pulley 15 about which passes a belt 16. The opposite end of this belt passes around a pulley 17, and the upper run of the belt contacts with certain of the rollers 13 to effect positive rotation thereof. Intermediate idler rollers 18 may be provided for maintaining the upper run of the belt 16 in engagement with any adjacent pair of rollers 13. The portion of the main conveyer preceding that with which the belt 16 is associated is also provided with a roller driving belt 19 passing around pulleys 20 at opposite ends thereof, and one of these pulleys is mounted upon a shaft 21. This shaft and the motor shaft are provided with sprockets connected by a drive chain 22.

At a plurality of desired points along the main conveyer, branch conveyers are arranged, one of these branch conveyers being illustrated in Figure 1 and being designated as a whole by the numeral 23. Each branch conveyer comprises a straight portion 24 leading to any desired destination and a curved portion 25 forming a continuation of the adjacent portion of the main conveyer. The branch conveyer comprises side rails 26 and 27 the latter of which forms a continuation of the adjacent rail 12, as will be apparent.

The rail 26 and the rail 12 of the succeeding portion of the main conveyer terminate at points adjacent each other, as shown in Figure 1, whereby articles are permitted to move freely along the main conveyer or around the branch conveyer without interference by the rails. In this connection it will be noted that all of the rails referred to have their upper edges projecting slightly above the plane of the tops of the conveyer rollers to act as guide means for carriers to be referred to. The straight portion of the branch conveyer is provided with rollers 28 journalled between the rails 26 and 27. The curved section 25 of the branch conveyer is similarly provided with rollers 29 which are radially arranged and have their inner ends journalled in the curved section of the rail 27. The outer ends of some of the radial rollers are journalled in the rails 11 and 26, while suitable bearings 30 and 31 are provided for the outer ends of the remaining rollers 29. In order to support packages in the triangular space between the radial rollers 29 and the rollers 13 of the succeeding portion of the main conveyer 10, an additional roller 32 has been provided, this roller having one end journalled in the rail 11 and its other end in the bearing 30. It will be apparent that any number of these supplemental rollers may be provided.

The radial rollers also are preferably live rollers and have been illustrated as being driven by belts 33 and 34 respectively passing around pulleys 35 and 36. The adjacent pulleys 35 and 36 carry bevel gears 37 and 38 meshing with an intermediate gear 39 whereby power is transmitted between the belts 33 and 34. Similarly the adjacent pulleys 17 and 35 are provided with bevel gears 40 and 41 meshing with an intermediate gear 42 whereby power is transmitted between the belts 16 and 33. At least the first of the rollers 28 of the straight portion of the branch conveyer are driven by a belt 43 passing around pulleys 44 and the adjacent pulleys 36 and 44 are provided with bevel gears 45 and 46 meshing with an intermediate bevel gear 47 whereby power is transmitted from the belt 34 to the belt 43.

The single source of power referred to also is operative for driving the rollers 13 of the succeeding stage of the main conveyer 10, illustrated in Figure 1. As shown, the succeeding stage of the main conveyer is provided with a roller driving belt 48 each end of which passes around pulleys 49. A chain 50 passes around sprockets carried respectively by the pulleys 20 and 49 adjacent the branch conveyer.

A plurality of rollers 51, rotatable about fixed vertical spindles 52 is arranged in the main conveyer just ahead of the branch conveyer, as shown in Figure 1. Similar rollers 53 and 54 are arranged in alinement with the rollers 51 on opposite sides of the switching point, and these rollers also are mounted on fixed vertical spindles 55 and 56.

The vertical rollers 51, 53 and 54 are operative for guiding an article carrier to be described along the main conveyer, and these rollers operate in conjunction with a plurality of control rollers 57. In a manner to be described, the rollers 57 are vertically movable to determine whether a carrier shall move directly along the main conveyer or shall be discharged to the branch conveyer. The control means for the rollers 57 are illustrated in detail in Figures 3 and 4 of the drawings.

As shown, each control roller 57 is mounted on a spindle 58 by means of anti-friction bearing 59. Each of the spindles 58 is mounted in a cylindrical carrier 60, and each of these carriers is provided with laterally outstanding ears 61 at opposite sides thereof adapted to rest upon vertically movable rails 62 preferably formed of angle iron, as shown in Figure 4. The ears 61 are secured to the rails 62 by rivets or other fastening elements 63.

The central cylindrical carrier 60 is provided with a coiled compression spring 64 the upper end of which engages the central spindle 58 as at 65. The lower end of the spring 64 engages against the bottom of the central carrier 60, and accordingly the spring urges the central roller 57 upwardly. This upward movement is limited by the provision of a head 66 on the lower end of the central spindle 58 engageable against the bottom of the carrier 60. Accordingly it will be apparent that in the absence of any pressure on the top of the central roller 57, this roller will move vertically to positions corresponding with the positions of the other rollers 57 when movement is imparted thereto by the rails 62.

Transverse shafts 67 extend beneath the side rails 11 and 12 and are journalled in bearings 68 carried thereby. Each shaft 67 carries cranks 69 between the free ends of which is connected a rod 70 extending through the rails 62. Accordingly it will be apparent that rotating movement of the shafts 67 is adapted to raise and lower the rails 62 and these elements are provided with cut out portions 71 to prevent them from contacting with the shafts 67 when being moved to their lowermost positions. It also will be apparent that vertical movement of the rails 62 is imparted to the rollers 57 to raise and lower these members. The rollers 57 normally occupy the upper position illustrated in Figures 3 and 4.

Outwardly of the rail 11, each shaft 67 is provided with a crank 72 and a pull rod 73 connected between the cranks 72. A solenoid 74 is arranged adjacent one end of the pull rod 73 and the armature 75 of the solenoid is pivotally connected to the pull rod as at 76. A spring 77 is connected between the pull rod and a post 78 carried by the rail 11 to urge the parts just referred to to normal position, and accordingly it will be apparent that the rollers 57 have a normal bias to the upper operative positions shown in Figures 3 and 4. Energization of the solenoid, however, is adapted to move the rollers 57 downwardly wholly below the plane of the tops of the rollers 29.

In a manner to be referred to, a carrier on the main conveyer is caused to be switched around to the branch conveyer when the rollers 57 are in their lower positions, and means are provided for holding the rollers in such positions when desired, and for releasing the rollers after the carrier has moved around upon the branch conveyer. Referring to Figures 3, 4 and 5, it will be noted that the central cylindrical carrier 60 for the central roller 57 is provided with a horizontal outstanding lug 79 beneath which is an inclined web 80. The means engageable with the lug 79 and web 80 is clearly shown in Figure 2. A latch 81 having a tapered face 82 at its inner end is slidable in a stationary guide 83. The opposite end of the latch is pivotally connected as at 84 to a pivoted arm 85 having an extension 86 engageable against a pin 87 to prevent downward swinging movement of the arm 85 beyond the position illustrated in Figure 2. A tension coil spring 88 has one end connected to the pivot pin 84 and its opposite end connected to a lug 89 carried by the guide 83. This spring urges the latch toward operative position, and movement of the latch toward such position is limited by a lug 90 carried by the latch and engageable with the adjacent end of the guide 83. It will be apparent that when the roller carriers 60 are moved downwardly the inclined web 80 engages the beveled face 82 of the latch to depress the latter, and the latch snaps into operative position above the lug 79 to lock the rollers 57 in their lower positions.

A bell crank lever 91 is pivotally mounted upon a shaft 92 and includes a vertical arm 93 and a horizontal arm 94, the latter being provided with a weight 95, as shown in Figure 2. The upper end of the arm 93 carries a U-shaped support 96 secured thereto as at 97, and a roller 98 is journalled between the arms of the support 96. The roller 98 obviously is normally arranged slightly above the plane of the rollers 29 to be engaged by article carriers moving thereover. The arm 93 carries a lug 99 engageable in a notch 100 formed in the arm 85, and the free end of the latter is inclined or curved downwardly and inwardly as at 101.

An article carrier adapted for use in connection with the apparatus is shown in Figures 6 and 7. The carrier is illustrated as a whole by the numeral 102 and includes a bottom or base 103 against which are secured spaced parallel battens 104. These battens have their outer faces spaced apart a distance slightly less than the distance between the rails 11 and 12 to be guided thereby. The inner faces of the battens are provided with metal bearing strips 105 having their inner faces spaced apart a distance somewhat greater than the diameter of the rollers 51, 53, 54 and 57, as clearly shown in Figure 4, and the bearing strips are engageable against the rollers as will be apparent.

The carrier may have its upper structure of any desired form. In the drawings the carrier has been illustrated as being provided with circular corner posts or standards 106, and horizontal supports 107 are connected between the end posts 106 to support a tray 108. Transverse plates 109 are connected between the tops and the end posts and are provided with openings 110 adapted to receive key pegs 111. The upper ends of the posts 106 also may be provided with the openings 110 to receive the key pegs if desired.

Vertical standards 112 are arranged on opposite sides of the main conveyer just in advance of the switching point and are connected to the rails 11 and 12 by plates 113. The upper ends of the standards 112 are connected by parallel cross members 114, and switches 115 are slidably supported by the cross arms 114. These switches are provided with depending switch arms 116 engageable by the key pegs 111 when the latter are arranged in the openings 110 corresponding in position to the switch arms as will be apparent.

One simple form of electrical circuit adapted for use with the apparatus has been shown in Figure 8. The circuit includes a source 117 one terminal of which is connected by a wire 118 to one of the arms 116 and the latter is movable to close a circuit to a contact 119 connected to a wire 120. The second switch arm 116 is shown as being connected to the wire 120 and operable to close the circuit to a contact 121 connected to one end of a wire 122. The latter wire is connected to one side of the solenoid 74, while the other terminal of the solenoid is connected to one end of a wire 123 leading back to the source 117.

The operation of the apparatus is as follows:

It will be apparent that any number of the branch conveyers may be provided according to the desired number of destinations to which article carriers are to be conveyed. Aside from the fact that the article carriers will be selectively keyed for discharge to the different branch conveyers, the operation of the switching apparatus for each branch conveyer is identical, and accordingly only one need be referred to in detail. Assuming that a carrier is traveling along the main conveyer toward the switch illustrated in Figure 1, and is not keyed for discharge at such switch, it will be apparent that the switch arms 116 will not be operated as the carrier passes therebeneath. Under such conditions, the rollers 57 will remain in their upper operative positions shown in Figures 3 and 4. Accordingly the carrier will move along the main conveyer with the battens 104 of the carrier straddling the various vertical rollers, and when the carrier reaches the radial rollers 29 they will tend to move the carrier around the curve of the switch. This movement, however, will be prevented inasmuch as the rollers 57 will engage the bearing strips 105 to guide the carrier for straight line movement along the main conveyer. Thus the carrier will pass the switch and continue on along the main conveyer until it reaches the switch for which it is keyed.

Assuming that a carrier is keyed for discharge to the branch conveyer illustrated in Figure 1, it will be apparent that as the carrier passes beneath the switches 115, the key pegs 111 will operate the switch arms 116 and thus complete the circuit illustrated in Figure 8. In this connection, it will be noted that the switch arms have been shown in Figure 8 as being connected in series, but it will be apparent that these switches may be connected in the circuit in any desired manner so long as the closing of both switches is required for completing the circuit.

As soon as the circuit referred to is completed, the solenoid 74 will be energized to attract the armature 75 and transmit a pulling force to the pull rod 73. This action rocks the shafts 67 in a counter-clockwise direction, as viewed in Figure 3, and thus the cranks 69 will swing downwardly and transmit a similar movement to the rails 62. Thus the rollers 57 will be moved to their lower positions wholly beneath the plane of the tops of the conveyer rollers, and thus the rollers 57 will be prevented from engaging the battens of the carriers. When the carrier reaches the radial rollers therefore, these rollers will divert the carrier around the curve of the switch, and the carrier thus will be discharged to the branch conveyer to be conveyed to its desired destination.

When the solenoid is energized to move the rollers 57 downwardly in the manner just described, the latch 81 comes into operation. The latch will be depressed by downward movement of the inclined web 80 and will be held in inoperative position until the lug 79 passes therebeneath, whereupon the latch will snap to operative position over the lug 79 to prevent return movement of the rollers 57 to operative position. As the carrier moves around the curve of the switch, it contacts with the roller 98 and thus swings the bell crank lever 91 about its pivot. Since the lug 99 is arranged in the notch 100, swinging movement of the bell crank lever retracts the latch 81 until it moves beyond the lug 79, whereupon the spring 77 returns the rollers 57 and the elements connected thereto to normal position.

After the latch 81 is released from the lug 79, further movement of the bell crank lever 91 will swing the lug 99 out of the notch 100, whereupon the spring 88 returns the latch to normal position ready for its next operation. After the carrier passes beyond the roller 98, the weight 95 will return the bell crank lever to normal position, and as such position is approached, the lug 99 will engage the curved face 101 of the arm 85 to move the latter upwardly and thus permit the lug 99 to reenter the notch 100 ready for the next operation.

It obviously is desirable that the apparatus should be fully operative with the carriers traveling one behind the other. For this purpose, the spring 64 and associated elements is provided whereby the rollers 57 may be returned to normal position before a carrier moving to a branch conveyer has passed entirely around the switch curve. The bell crank lever 91 and associated parts are arranged in such a position that operation thereof takes place before a carrier being switched has passed entirely around the curve of the switch. This operation in fact takes place at a point during the movement of the carrier at which time the roller 57 adjacent the approach end of the switch is arranged between the battens of the carrier and the other end roller 57 is arranged wholly outwardly of the batten of the carrier adjacent the outer side of the curve of the switch. Accordingly such rollers are free to move upwardly to their normal operative positions before the carrier has passed completely around the curve of the switch, but the operation referred to takes place while the central roller 57 is arranged directly beneath one of the battens.

Thus when the rollers 57 are released by the latch mechanism to return to normal position, one of the battens of the carrier will prevent such upward movement of the central roller 57, and the spring mounting of this roller permits it to remain in a depressed position independently of all of the other operating parts until the carrier has passed wholly therebeyond, at which time the central roller 57 will be snapped upwardly to normal position by the spring 64. With the arrangement of parts described, it has been found that the carriers may travel along the main conveyer in actual contact with each other, and successive carriers may be caused to follow different paths in accordance with their desired destinations. Thus it will be apparent that it is wholly unnecessary to space the carriers along the conveyer to prevent them from reaching incorrect destinations.

From the foregoing it will be apparent that the present construction provides a fully automatic switch mechanism whereby articles of different characters may be loaded upon carriers movable upon a main conveyer for discharge at different destinations in accordance with the manner in which they are keyed. It also will be apparent that such carriers may follow directly behind each other without being spaced, thus permitting the main conveyer to be completely loaded at all times if desired.

The apparatus has been described as applied to a straight main conveyer having switches leading therefrom at various points. The invention, however, is not so limited in its application. For example, the invention may be applied at the end of a main supply conveyer for determining to which of a plurality of branch or receiving conveyers an article will be delivered. When the invention is so applied, conveyer rollers are employed for normally tending to convey articles from the supply conveyer to one of the branch or receiving conveyers, while the vertically movable rollers are operable for changing the destination of an approaching article to the other receiving conveyer. In Figure 1, therefore, the portion of the main conveyer preceding the switch may be considered as a supply conveyer, while the branch conveyer and the portion of the main conveyer beyond the switch may be considered as a pair of receiving conveyers to which articles are to be selectively conveyed. In the claims, therefore, the pair of receiving conveyers referred to are to be construed as covering a switching conveyer of the character just described as well as the form of system specifically illustrated.

It is to be understood that the form of our invention herewith shown and described is to be taken as a preferred example of the same and that various changes in the shape, size and arrangement of parts may be resorted to without departing from the spirit of the invention or the scope of the subjoined claims.

We claim:

1. A switching conveyer comprising a supply conveyer, a pair of receiving conveyers associated therewith to receive articles therefrom, means constantly operating to tend to move articles from said supply conveyer to one of the receiving conveyers, normally operative laterally immovable means vertically movable to operative position to engage the bottoms of articles for preventing movement of articles to said last named receiving conveyer and guiding them to the other receiving conveyer, and means for rendering said last named means inoperative.

2. A switching conveyer comprising a supply conveyer, a pair of receiving conveyers associated therewith to receive articles therefrom, means constantly tending to move articles from said supply conveyer to one of the receiving conveyers, normally operative vertically movable means engageable with the bottoms of the articles for preventing movement thereof to the last named receiving conveyer and for guiding the articles to the other receiving conveyer, and means operative for effecting vertical movement of said last named means to inoperative position whereby articles will be moved to said first named receiving conveyer.

3. A switching conveyer comprising a main conveyer, a branch conveyer, a conveying switch directly connecting said main and branch conveyers whereby articles on the main conveyer normally tend to move to the branch conveyer, and vertically movable and laterally immovable means operative for engaging the bottoms of articles for rendering the conveying switch inoperative and for guiding articles along said main conveyer past said conveying switch.

4. A switching conveyer comprising a main conveyer, a branch conveyer, a conveying switch directly connecting said main and branch conveyers whereby articles on the main conveyer normally tend to move to the branch conveyer, normally operative means laterally immovable and vertically movable into operative position to engage the bottoms of articles for rendering the conveying switch inoperative and for guiding articles along said main conveyer past said conveying switch, and means for rendering said last named means inoperative whereby articles approaching the conveying switch will pass thereover to said branch conveyer.

5. A switching conveyer comprising a supply conveyer, a pair of receiving conveyers associated therewith to receive articles therefrom, means normally operating to move articles from said supply conveyer to one of the receiving conveyers, normally operative laterally immovable means vertically movable to operative position to engage the bottoms of articles for preventing movement of articles to said last named receiving conveyer and for guiding them to the other receiving conveyer, and means operative by an article of a certain character moving along the supply conveyer for rendering said last named means inoperative.

6. A switching conveyer comprising a supply conveyer, a pair of receiving conveyers associated therewith to receive articles therefrom, means constantly operating to tend to move articles from said supply conveyer to one of the receiving conveyers, means vertically movable from an inoperative position to an operative position to engage the bottoms of articles for preventing movement of articles to the last named receiving conveyer and for guiding them to the other receiving conveyer, said last named means normally occupying one of said positions, means operative by an article of a certain character for moving said last named means to inoperative position, and means operative by such article for restoring the normal condition of said last named means.

7. A switching conveyer comprising a supply conveyer, a pair of receiving conveyers associated therewith to receive articles therefrom, means constantly operating to tend to move articles from said supply conveyer to one of the receiving conveyers, normally operative laterally immovable means vertically movable to operative position to engage the bottoms of articles for preventing articles from moving to the last named receiver and for guiding them to the other receiving conveyer, means operative by an article of a certain character for rendering said last named means inoperative whereby the article will be moved to the first named receiving conveyer, and means operative by an article moving to the first named receiving conveyer for restoring the normal condition of said last named means.

8. A switching conveyer comprising a supply conveyer, a pair of receiving conveyers associated therewith to receive articles therefrom, means constantly operating to tend to move articles from said supply conveyer to one of the receiving conveyers, an article carrier including a longitudinal bottom guide, vertically movable means engageable with said guide for preventing movement of the carrier to said last named receiving conveyer and for guiding it to the other receiving conveyer, and means operative for effecting vertical movement of said last named means to inoperative position whereby the carrier will be moved to said first named receiving conveyer.

9. A switching conveyer comprising a supply conveyer, a pair of receiving conveyers associated therewith to receive articles therefrom, means constantly operating to tend to move articles from said supply conveyer to one of the receiving conveyers, an article carrier, a pair of parallel members carried beneath said carrier and defining a guide, and a plurality of guide rollers rotatable about vertical axes and movable upwardly into said guide for rendering said means inoperative and for guiding the carrier to the other receiving conveyer.

10. A switching conveyer comprising a supply conveyer, a pair of receiving conveyers associated therewith to receive articles therefrom, means constantly operating to tend to move articles from said supply conveyer to one of the receiving conveyers, an article carrier, a pair of parallel members carried beneath said carrier and defining a guide, a plurality of guide rollers rotatable about vertical axes and vertically movable from an inoperative position to an operative position in engagement with said guide for rendering said means inoperative and for guiding the carrier to the other receiving conveyer, said rollers being normally arranged in operative position, and means operative by a keyed carrier for moving said rollers to inoperative position.

11. Apparatus constructed in accordance with claim 10 wherein the second named receiving conveyer is provided with means operative by a carrier contacting therewith for restoring said rollers to normal position.

12. Apparatus constructed in accordance with claim 10 provided with resilient means constantly urging said rollers to normal position, latch means for holding said rollers in inoperative position when moved to such position, and means operative by a carrier moving over the second named receiving conveyer for releasing said latch means.

13. Apparatus constructed in accordance with claim 10 wherein the second named receiving conveyer is provided with means operative by a carrier contacting therewith while a portion of the carrier is still arranged over said rollers for restoring the latter to normal position, at least one of said rollers being vertically yieldable in contact with one of said parallel members when said last named means is operated.

14. A switching conveyer comprising a supply conveyer, a pair of receiving conveyers associated therewith to receive articles therefrom, means normally operative to tend to move articles from said supply conveyer to one of the receiving conveyers, an article carrier provided in the bottom thereof with a longitudinal guide groove, vertically movable means alined with the other receiving conveyer and engageable in said guide groove for preventing movement of the carrier to the first named receiving conveyer and for guiding it to the other receiving conveyer, and means operative for effecting vertical movement of said last named means to inoperative position whereby the carrier will be moved to said first named receiving conveyer.

15. A switching conveyer comprising a supply conveyer, a pair of receiving conveyers branching from the supply conveyer to receive articles therefrom, means constantly operating to tend to move articles from said supply conveyer to one of said receiving conveyers, article carriers each provided with a longitudinal guide groove in the bottom thereof, a plurality of members engageable in said guide groove, one of said members being arranged at the entrance end of the junction of said receiving conveyers and engageable in the guide groove of an article carrier destined for either receiving conveyer, a plurality of said members beyond said first named member constituting guide members mounted for vertical movement between an upper operative position engageable with said guide groove and a lower inoperative position out of the path of said guide groove, said guide members when in operative position being engageable in the guide groove of a carrier to guide the carrier for movement to the other receiving conveyer, said guide members being normally arranged in one position, and means for effecting movement of said guide members to the other position.

16. A switching conveyer comprising a supply conveyer, a pair of receiving conveyers branching from the supply conveyer to receive articles therefrom, means constantly operating to tend to move articles from said supply conveyer to one of said receiving conveyers, article carriers each provided with a longitudinal guide groove in the bottom thereof, a plurality of members engageable in said guide groove, one of said members being arranged at the entrance end of the junction of said receiving conveyers and engageable in the guide groove of an article carrier destined for either receiving conveyer, a plurality of said members beyond said first named member constituting guide members mounted for vertical movement between an upper operative position engageable with said guide groove and a lower inoperative position out of the path of said guide groove, said guide members when in operative position being engageable in the guide groove of a carrier to guide the carrier for movement to the other receiving conveyer, means tending to hold said guide members in operative position, means operative by articles of a certain character for effecting movement of said guide members to the other position, and means in the first named receiving conveyer operative by a carrier passing thereover for releasing said guide members for movement to operative position, said last named means being arranged a distance from said first named member not in excess of the length of one of said carriers.

In testimony whereof we affix our signatures.

HENRY R. GOTTHARDT.
WILLIAM E. CAIN.